April 10, 1934.  J. R. GUILDFORD  1,954,044
STEAM VALVE
Filed May 9, 1933
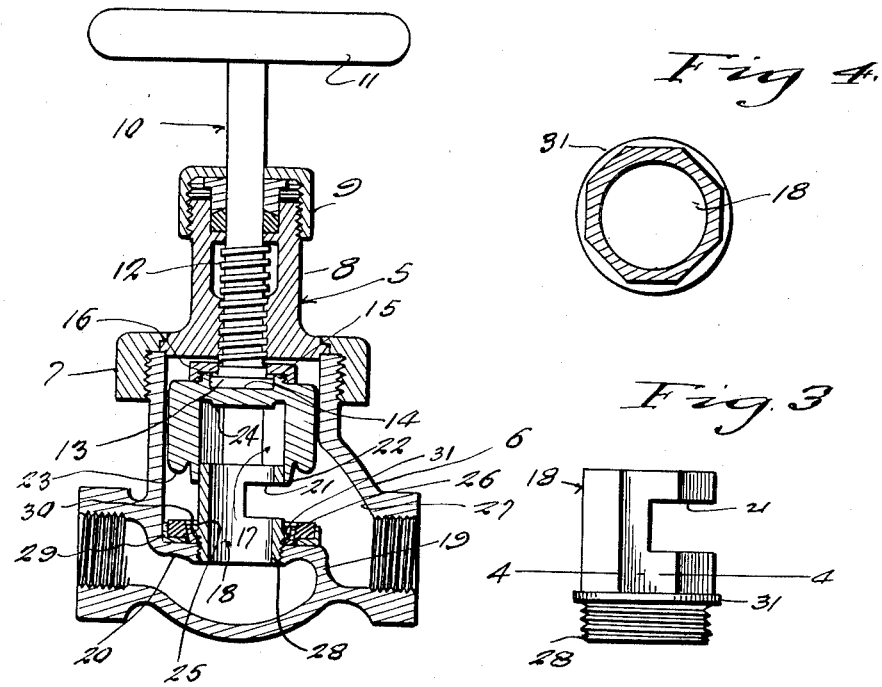
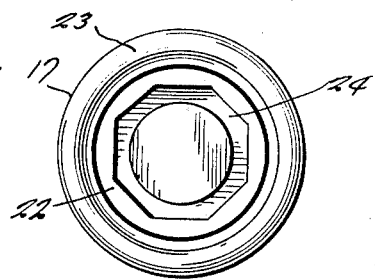
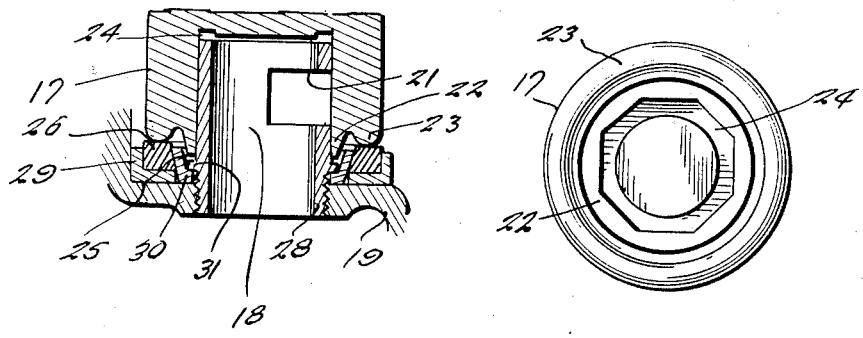
Inventor
Joseph R. Guildford
By Clarence A. O'Brien
Attorney Patented Apr. 10, 1934

1,954,044

UNITED STATES PATENT OFFICE 1,954,044

STEAM VALVE

Joseph R. Guildford, Regina, Saskatchewan, Canada

Application May 9, 1933, Serial No. 670,203

2 Claims. (Cl. 251—78)

My invention relates to improvements in steam valves or the like, and an important object of the invention is to provide means to protect the valves against the destructive action of steam at high velocity, enabling the valves to be "cracked" or slightly opened so as to permit positive control of the flow of steam in any quantity at will, without damage to the valve, and to so construct the valves that the steam pressure is utilized in a manner to aid the operator to more easily open the valve.

This application is a continuation in part of my co-pending application for a steam valve or the like, which was filed April 27, 1932 and designated Serial No. 607,850.

It is also an important object of my invention to construct the valve casings or valves of this type to prevent restriction to flow, permitting the fluent and easy passage of steam therethrough, and to provide for easy replacement of parts subjected to wear.

These and other objects of my invention, will be readily understood from a reading of the following description and drawing, wherein for purposes of illustration I have shown a preferred embodiment of the invention.

In the drawing:—

Figure 1 is a general vertical longitudinal sectional view through the embodiment.

Figure 2 is a bottom plan view of the valve.

Figure 3 is a side elevational view of the tubular member.

Figure 4 is a horizontal sectional view taken through the tubular member on the line 4—4 and looking downwardly.

Figure 5 is a vertical transverse sectional view taken through the valve, seat, web and tubular member showing a closed position of the valve.

Referring in detail to the drawing, wherein like numerals refer to like parts throughout the same, the numeral 5 generally designates the valve which comprises the casing 6, the coupling member 7, the valve stem guide 8 carrying the packing member 9 through which operates the rotatable valve stem 10 carrying the handwheel 11. The valve stem is threaded right-handed as indicated at 12 for cooperation with a threaded bore in the guide 8, and the inner end of the stem is provided with an enlargement in the form of an annular flange 13 which is received in a depression 14 about which rises a neck or collar 15 which is exteriorly screw-threaded to receive the retaining member 16 for connecting the body of the valve head 17 operatively with the valve stem 10.

The valve head 17 comprises a hollow cylindrical body having a closed top and an open bottom, with the interior octagon shaped. The lower side of the closed top of valve head 17 as noted will always be subjected to steam pressure when the valve is closed. The advantage to be gained by this partially self-opening feature will be readily understood, as the steam pressure will actually assist in opening the valve and relieve considerable strain on the valve stem at 12, the threaded bore in the guide 8, and the retaining member 16, when this assistance is most needed. The valve head 17 is adapted to closely and slidably fit upon an exteriorly octagon shaped vertically disposed tubular member and guide 18 with which it has an outside engagement. The object of providing the octagon shaped interior of the valve head 17 to slidably fit upon the octagon shaped exterior of the tubular member 18 is to prevent the valve head 17 from turning. If the depending skirt 22 hereinafter mentioned becomes worn sufficiently to prevent protection to the valve seat engaging portion 23, the valve head 17 can be reversed by giving it a half turn when the bonnet of the valve is removed, thereby doubling the life of the valve head.

The tubular member 18 is provided with a left hand thread at 28 and threadedly connected to a web 19, carried across the body of the valve, and which is concaved at 20. The body or casing 6 is expanded as indicated at 27 to provide a large passage between its wall and the partition 19 so as to provide for a fluent flow of steam through the opening 21 in the tubular member 18. It will be noted that the passage through the valve is direct and unrestricted when fully open. Friction is therefore diminished to a negligible amount. The opening 21 is generally circumferential and is horizontally elongated. Means on the valve head 17 for preventing the destructive action of steam at high velocity comprises the depending skirt 22 which depends below the rounded or convexed valve seat engaging portion 23.

The lower end 23 of the valve head is rounded or convexed for the purpose of lengthening the life of the valve. By rounding said end of the head convexly, it will readily be seen that the seating area is greatly increased.

The valve engaging seat 26 is composed of a removable seat held in place with an annular right angled outside ring 29, and an annular flare shaped inside ring 30. These rings are held concentric and tightly clamped down by the flange 31 which is integral with the outside of the tubular member 18.

It will be noted that the inside flared ring 30 wedges the removable seat 26 into place and tightly holds it.

It is obvious that as the valve head 17 is screwed down the depending skirt 22 will close off the opening 21, and when this opening has been closed off by the depending skirt 22 the passage of steam therethrough is positively prevented. It is again obvious that as the depending skirt portion 22 crosses the opening 21 that the valve seat engaging portion 23 will not be subjected to the initial impact of the steam as it is passing through the valve at high velocity, but that the skirt 22 will receive this impact instead as it moves in advance of the valve seat engaging portion 23. The bottom portion of opening 21 in the tubular member 18 is considerably elevated above the seat 26. This serves the same purpose as the depending skirt 22, and prevents direct initial contact of the steam at high velocity on the seat 26.

It will be noted that no steam can pass through the valve until the lower end on the depending skirt 22 has been raised above the lower edge of opening 21 in the tubular member 18. This provision enables the valve to be used in a cracked or partially open position without any destructive effect on the seat engaging portion 23 and seat 26. In addition to this novel feature, the tubular member 18 being closely fitted to the valve head 17 permits the valve to be placed in any position, vertical or horizontal without disturbing the action of the valve head essential for the proper seating of the valve. The valve head 17 is slidably fitted to the tubular member 18, and the opening 21 allows only one half of the circumference of members 22 and 23 to be in the line of the flow of steam, the remaining half being fully protected behind the tubular member 18, ready for future use when required.

As the valve head 17 is moved downwardly, a groove 24 formed in the top of the interior of the valve receives the upper end of the tubular member 18, and at the same time the depending skirt 22 enters a groove 25 which surrounds the lower end portion of the tubular member 18 inwardly of the valve seat 26 and is defined by the valve seat and the side of the member 18. It will be obvious that this arrangement provides a very close and nonleaking engagement of the parts, so that passage of steam through the valve is positively prevented while the valve is fully closed.

The thread 28 on the lower end of the tubular member 18 is a left hand thread, the object of this being to prevent its being unscrewed when the valve head 17 is being raised. As above mentioned the valve stem 10 is threaded right handed, consequently it is obvious that when the valve is being opened the left hand thread on the tubular member will have a tendency to become tighter, due to a possible slight relative rotation of the octagon shaped engaging portions of the valve head and member 18.

The octagon shaped exterior of the tubular member 18 will permit a socket wrench to be fitted for its removal, should it be found necessary to replace it with another, or install a new seat 26.

The principal object of providing the structure recited is to prevent damage at all times to the valve seat 26 and to the valve seat engaging portion 23 by impingement thereon of steam at high velocity, regardless of whether the valve is partially open, or wide open, and to provide a valve structure that can be throttled or controlled without in any way damaging the valve seat 26 and valve seat engaging portion 23, so that the parts will last indefinitely in a more effective condition, and to provide for easy renewal of seats and valves when necessary, and it is believed obvious that these objects are attained in an efficient and excellent manner.

Though I have shown and described herein a preferred embodiment of the invention, it is to be definitely understood that I do not desire to limit the application of the invention thereto, and any change or changes may be made in material and in structure and arrangement of parts, within the spirit of the invention and the scope of the subjoined claims.

What is claimed is:—

1. A valve comprising a casing, a partition dividing the casing and provided with an opening, a tubular guide mounted within the opening, a replaceable valve seat member surrounding and having a portion spaced from the tubular guide, said tubular guide being provided with a port in one side, a tubular valve head slidable on the guide to close its port and having one end closed, means on the remaining end of the valve head for receiving initial impact of the fluid passing through the valve, said means slidable on the guide and being arranged to enter the space between the valve seat member and the tubular guide when the valve is closed, and operative means for the valve head.

2. A valve comprising a casing, a partition dividing the casing and provided with an opening, a tubular guide mounted within the opening, a replaceable valve seat member surrounding and having a portion spaced from the tubular guide, said tubular guide being provided with a port in one side, a tubular valve head slidable on the guide to close its port and having one end closed, means on the remaining end of the valve head for receiving initial impact of the fluid passing through the valve, said means slidable on the guide and being arranged to enter the space between the valve seat member and the tubular guide when the valve is closed, and operative means for the valve head, said replaceable valve seat member comprising an annular retainer, and an inner relatively movable ring forming between them a channel, and a compressible annular valve seat in the channel.

JOSEPH R. GUILDFORD.